United States Patent
Wang et al.

(10) Patent No.: US 12,488,571 B2
(45) Date of Patent: Dec. 2, 2025

(54) GENERATING IMAGES FOR NEURAL NETWORK TRAINING

(71) Applicant: Microsoft Technology Licensing, LLC, Redmond, WA (US)

(72) Inventors: Rui Wang, Zurich (CH); Le Chen, Zurich (CH); Marc André Léon Pollefeys, Zurich (CH)

(73) Assignee: Microsoft Technology Licensing, LLC., Redmond, WA (US)

( * ) Notice: Subject to any disclaimer, the term of this patent is extended or adjusted under 35 U.S.C. 154(b) by 313 days.

(21) Appl. No.: 18/191,845

(22) Filed: Mar. 28, 2023

(65) Prior Publication Data

US 2024/0331356 A1    Oct. 3, 2024

(51) Int. Cl.
*G06V 10/774* (2022.01)
*G06T 7/73* (2017.01)
*G06V 10/82* (2022.01)

(52) U.S. Cl.
CPC .............. *G06V 10/774* (2022.01); *G06T 7/74* (2017.01); *G06V 10/82* (2022.01); *G06T 2207/30244* (2013.01)

(58) Field of Classification Search
None
See application file for complete search history.

(56) References Cited

U.S. PATENT DOCUMENTS

2024/0265504 A1\* 8/2024 Wynn ................ G06T 17/00

OTHER PUBLICATIONS

Adamkiewicz, et al., "Vision-Only Robot Navigation in a Neural Radiance World", In Journal of IEEE Robotics and Automation Letters, vol. 7, Issue: 2, Feb. 11, 2022, pp. 4606-4613.
Amini, et al., "Deep Evidential Regression", In Journal of Advances in Neural Information Processing Systems, vol. 33, Dec. 6, 2020, pp. 1-11.
Arandjelovic, et al., "All About VLAD", In Proceedings of IEEE Conference on Computer Vision and Pattern Recognition, Jun. 23, 2013, pp. 1578-1585.
Arandjelovic, et al., "NetVLAD: CNN Architecture for Weakly Supervised Place Recognition", In Proceedings of the IEEE Conference on Computer Vision and Pattern Recognition, Jun. 27, 2016, pp. 5297-5307.
Bao, et al., "Evidential Deep Learning for Open Set Action Recognition", In Proceedings of the IEEE/CVF International Conference on Computer Vision, Oct. 10, 2021, pp. 13349-13358.
Barron, et al., "Mip-NeRF 360: Unbounded Anti-Aliased Neural Radiance Fields", In Proceedings of the IEEE/CVF Conference on Computer Vision and Pattern Recognition, Jun. 18, 2022, pp. 5470-5479.

(Continued)

*Primary Examiner* — Leon Flores
(74) *Attorney, Agent, or Firm* — Barta Jones, PLLC (57) ABSTRACT

A plurality of training examples is accessed, each training example comprising an image of a scene and a pose of a viewpoint from which the image was captured. A neural radiance field is trained using the training examples. A plurality of generated images is computed, by, for each of a plurality of randomly selected viewpoints, generating a color image and a depth image of the scene from the neural radiance field. A neural network is trained using the generated images.

20 Claims, 7 Drawing Sheets

(56) References Cited

OTHER PUBLICATIONS

Bay, et al., "SURF: Speeded Up Robust Features", In Proceedings of European conference on computer vision, May 7, 2006, pp. 404-417.

Bi, et al., "Neural Reflectance Fields for Appearance Acquisition", In Repository of arXiv:2008.03824v1, Aug. 9, 2020, 11 Pages.

Brachmann, et al., "DSAC—Differentiable RANSAC for Camera Localization", In Proceedings of the IEEE Conference on Computer Vision and Pattern Recognition, Jul. 21, 2017, pp. 6684-6692.

Brachmann, et al., "Learning Less Is More—6D Camera Localization via 3D Surface Regression", In Proceedings of the IEEE Conference on Computer Vision and Pattern Recognition, Jun. 18, 2018, pp. 4654-4662.

Brachmann, et al., "Neural-Guided RANSAC: Learning Where to Sample Model Hypotheses", In Proceedings of the IEEE/CVF International Conference on Computer Vision, Oct. 27, 2019, pp. 4322-4331.

Brachmann, et al., "Visual Camera Re-Localization From RGB and RGB-D Images Using DSAC", In Journal of Transactions on Pattern Analysis and Machine Intelligence, vol. 44, Issue: 9., Apr. 2, 2021, pp. 5847-5865.

Brahmbhatt, et al., "Geometry-Aware Learning of Maps for Camera Localization", In Proceedings of the IEEE Conference on Computer Vision and Pattern Recognition, Jun. 18, 2018, pp. 2616-2625.

Brualla, et al., "NeRF in the Wild: Neural Radiance Fields for Unconstrained Photo Collections", In Proceedings of the IEEE/CVF Conference on Computer Vision and Pattern Recognition, Jun. 19, 2021, pp. 7210-7219.

Cavallari, et al., "On-The-Fly Adaptation of Regression Forests for Online Camera Relocalisation", In Proceedings of the IEEE Conference on Computer Vision and Pattern Recognition, Jul. 21, 2017, pp. 4457-4466.

Chen, et al., "DFNet: Enhance Absolute Pose Regression with Direct Feature Matching", In Proceedings of 17th ECCV, Nov. 3, 2022, 17 Pages.

Chen, et al., "Direct-PoseNet: Absolute Pose Regression with Photometric Consistency", In Proceedings of the International Conference on 3D Vision, Dec. 1, 2021, pp. 1175-1185.

Chen, et al., "Exploring Simple Siamese Representation Learning", In Proceedings of the IEEE/CVF Conference on Computer Vision and Pattern Recognition, Jun. 19, 2021, pp. 15750-15758.

Chen, et al., "iNeRF: Inverting Neural Radiance Fields for Pose Estimation", In Proceedings of IEEE/RSJ International Conference on Intelligent Robots and Systems, Sep. 27, 2021, pp. 1323-1330.

Chen, et al., "MVSNeRF: Fast Generalizable Radiance Field Reconstruction From Multi-View Stereo", In Proceedings of the IEEE/CVF International Conference on Computer Vision, Oct. 10, 2021, pp. 14124-14133.

Chen, et al., "NeRF-Supervision: Learning Dense Object Descriptors from Neural Radiance Fields", In Proceedings of International Conference on Robotics and Automation, May 23, 2022, pp. 6496-6503.

Chen, et al., "Representation Subspace Distance for Domain Adaptation Regression", In Proceedings of the 38th International Conference on Machine Learning, Jul. 18, 2021, 11 Pages.

Chen, et al., "TensoRF: Tensorial Radiance Fields", In Proceedings of European Conference on Computer Vision, Nov. 11, 2022, pp. 333-350.

Deng, et al., "Depth-Supervised NeRF: Fewer Views and Faster Training for Free", In Proceedings of the IEEE/CVF Conference on Computer Vision and Pattern Recognition, Jun. 18, 2022, pp. 12882-12891.

Detone, et al., "SuperPoint: Self-Supervised Interest Point Detection and Description", In Proceedings of the IEEE Conference on Computer Vision and Pattern Recognition, Jun. 18, 2018, pp. 337-349.

Dong, et al., "Visual Localization via Few-Shot Scene Region Classification", In Repository of arXiv:2208.06933v1, Aug. 14, 2022, 12 Pages.

Dusmanu, et al., "D2-Net: A Trainable CNN for Joint Description and Detection of Local Features", In Proceedings of the IEEE/CVF Conference on Computer Vision and Pattern Recognition, Jun. 16, 2019, pp. 8092-8101.

Fischler, et al., "Random sample consensus: a paradigm for model fitting with applications to image analysis and automated cartography", In Journal of Communications of the ACM vol. 24, Issue 6, Jun. 1, 1981, pp. 381-395.

Gal, et al., "Dropout as a Bayesian Approximation: Representing Model Uncertainty in Deep Learning", In Proceedings of The 33rd International Conference on Machine Learning, Jun. 11, 2016, pp. 1050-1059.

Gao, et al., "Complete solution classification for the perspective-three-point problem", In Proceedings of IEEE Transactions on Pattern Analysis and Machine Intelligence vol. 25, Issue: 8, Aug. 4, 2003, pp. 930-943.

Garbin, et al., "FastNeRF: High-Fidelity Neural Rendering at 200FPS", In Proceedings of the IEEE/CVF International Conference on Computer Vision, Oct. 10, 2021, pp. 14346-14355.

Georgakis, et al., "Learning to Map for Active Semantic Goal Navigation", In Repository of arXiv:2106.15648v1, Jun. 29, 2021, 17 Pages.

Georgakis, et al., "Uncertainty-driven Planner for Exploration and Navigation", In Repository of arXiv:2202.11907v1, Feb. 24, 2022, 8 Pages.

Guo, et al., "Neural 3D Scene Reconstruction With the Manhattan-World Assumption", In Proceedings of the IEEE/CVF Conference on Computer Vision and Pattern Recognition, Jun. 18, 2022, pp. 5511-5520.

Harris, et al., "A Combined Corner And Edge Detector", In Proceedings of Alvey Vision Conference, vol. 15, No. 50, Aug. 31, 1998, pp. 147-152.

Hedman, et al., "Deep blending for free-viewpoint image-based rendering", In Journal of ACM Transactions on Graphics, vol. 37, Issue 6, Dec. 4, 2018, 15 Pages.

Huang, et al., "VS-Net: Voting With Segmentation for Visual Localization", In Proceedings of the IEEE/CVF Conference on Computer Vision and Pattern Recognition, Jun. 19, 2021, pp. 6101-6111.

Ichnowski, et al., "Dex-NeRF: Using a Neural Radiance Field to Grasp Transparent Objects", In Repository of arXiv:2110.14217v1, Oct. 27, 2021, 11 Pages.

Jain, et al., "Maximizing Overall Diversity for Improved Uncertainty Estimates in Deep Ensembles", In Proceedings of the AAAI Conference on Artificial Intelligence, vol. 34, No. 4, Apr. 3, 2020, pp. 4264-4271.

Kendall, et al., "Geometric Loss Functions for Camera Pose Regression With Deep Learning", In Proceedings of the IEEE Conference on Computer Vision and Pattern Recognition, Jul. 21, 2017, pp. 5974-5983.

Kendall, et al., "PoseNet: A Convolutional Network for Real-Time 6-DOF Camera Relocalization", In Proceedings of the IEEE International Conference on Computer Vision, Dec. 7, 2015, pp. 2938-2946.

Kendall, et al., "What Uncertainties Do We Need in Bayesian Deep Learning for Computer Vision?", In Journal of Advances in Neural Information Processing Systems, vol. 30, Dec. 4, 2017, 11 Pages.

Kingma, et al., "Adam: A Method for Stochastic Optimization", In Repository of arXiv:1412.6980v6, Jun. 23, 2015, 15 Pages.

Kingma, et al., "Variational dropout and the local reparameterization trick", In Journal of Advances in neural Information processing systems, vol. 28, Dec. 7, 2015, 9 Pages.

Kononenko, Igor, "Bayesian Neural Networks", In Journal of Biological Cybernetics, vol. 61, Issue 5, Sep. 1989, pp. 361-370.

Lakshminarayanan, et al., "Simple and Scalable Predictive Uncertainty Estimation using Deep Ensembles", In Journal of Advances in Neural Information Processing Systems, vol. 30, Dec. 4, 2017, 12 Pages.

Lee, et al., "Uncertainty Guided Policy for Active Robotic 3D Reconstruction Using Neural Radiance Fields", In Journal of IEEE Robotics and Automation Letters, vol. 7, Issue: 4, Oct. 10, 2022, pp. 12070-12077.

(56) References Cited

OTHER PUBLICATIONS

Lepetit, et al., "EPnP: An Accurate O(n) Solution to the PnP Problem", In International Journal of Computer Vision, vol. 81, No. 2, Jul. 19, 2008, pp. 155-166.
Levoy, et al., "Light Field Rendering", In Proceedings of the 23rd Annual Conference on Computer Graphics and Interactive Techniques, Aug. 1, 1996, pp. 31-42.
Li, et al., "Full-Frame Scene Coordinate Regression for Image-Based Localization", In Repository of arXiv:1802.03237v1, Feb. 9, 2018, 9 Pages.
Wang, et al., "Image Quality Assessment: From Error Visibility to Structural Similarity", In Journal of IEEE Transactions on Image Processing, vol. 13, Issue: 4, Apr. 13, 2004, pp. 600-612.
Wang, et al., "NeRF-: Neural Radiance Fields Without Known Camera Parameters", In Repository of arXiv:2102.07064v2, Feb. 16, 2021, 10 Pages.
Wang, et al., "NeuS: Learning Neural Implicit Surfaces by Volume Rendering for Multi-view Reconstruction", In Journal of Advances in Neural Information Processing Systems, vol. 34, Dec. 6, 2021, pp. 1-13.
Wei, et al., "NerfingMVS: Guided Optimization of Neural Radiance Fields for Indoor Multi-View Stereo", In Proceedings of the IEEE/CVF International Conference on Computer Vision, Oct. 10, 2021, pp. 5610-5619.
Xu, et al., "SinNeRF: Training Neural Radiance Fields on Complex Scenes from a Single Image", In Repository of arXiv:2204.00928v1, Apr. 2, 2022, 18 Pages.
Yang, et al., "Camera Pose Estimation and Localization with Active Audio Sensing", In Proceedings of European Conference on Computer Vision, Oct. 22, 2022, pp. 271-291.
Yariv, et al., "Volume Rendering of Neural Implicit Surfaces", In Journal of Advances in Neural Information Processing Systems, vol. 34, Dec. 6, 2021, pp. 1-11.
Yu, et al., "PixelNeRF: Neural Radiance Fields From One or Few Images", In Proceedings of the IEEE/CVF Conference on Computer Vision and Pattern Recognition, Jun. 19, 2021, pp. 4578-4587.
Yu, et al., "PlenOctrees for Real-Time Rendering of Neural Radiance Fields", In Proceedings of the IEEE/CVF International Conference on Computer Vision, 2021, pp. 5752-5761.
Zhang, et al., "Learning to Detect Features in Texture Images", In Proceedings of the IEEE Conference on Computer Vision and Pattern Recognition, Jun. 18, 2018, pp. 6325-6333.
Zhang, et al., "NeRFactor: Neural Factorization of Shape and Reflectance Under an Unknown Illumination", In Journal of ACM Transactions on Graphics, vol. 40, Issue 6, Dec. 10, 2021, pp. 1-18.
Zhang, et al., "Reference Pose Generation for Long-term Visual Localization via Learned Features and View Synthesis", In International Journal of Computer Vision, vol. 129, No. 4, Dec. 23, 2020, pp. 821-844.
Zhang, et al., "The Unreasonable Effectiveness of Deep Features as a Perceptual Metric", In Proceedings of the EEE Conference on Computer Vision and Pattern Recognition, Jun. 18, 2018, pp. 586-595.
Zhi, et al., "In-Place Scene Labelling and Understanding With Implicit Scene Representation", In Proceedings of the EEE/CVF International Conference on Computer Vision, Oct. 10, 2021, pp. 15838-15847.
Zhou, et al., "Evaluating Local Features for Day-Night Matching", In Proceedings of European Conference on Computer Vision, Nov. 24, 2016, pp. 724-736.
Zhou, et al., "KFNet: Learning Temporal Camera Relocalization Using Kalman Filtering", In Proceedings of the IEEE/CVF Conference on Computer Vision and Pattern Recognition, Jun. 13, 2020, pp. 4919-4928.
International Search Report and Written Opinion received for PCT Application No. PCT/US2024/019329, Jun. 26, 2024, 16 pages.
Li, et al.,"Full-Frame Scene Coordinate Regression for Image-Based Localization," arXiv preprint, Jun. 25, 2018, 9 Pages.
Moreau, et al., "LENS: Localization enhanced by NeRF synthesis," Conference on Robot Learning, Oct. 13, 2021, pp. 1347-1356.

Roessle, et al., "Dense Depth Priors for Neural Radiance Fields from Sparse Input Views," Proceedings of the IEEE/CVF Conference on Computer Vision and Pattern Recognition, Jun. 18, 2022, pp. 12892-12901.
Shen, et al.,"Conditional-Flow NeRF: Accurate 3D Modelling with Reliable Uncertainty Quantification," arXiv preprint, Feb. 9, 2018, pp. 540-557.
Li, et al., "Hierarchical Scene Coordinate Classification and Regression for Visual Localization", In Proceedings of the IEEE/CVF Conference on Computer Vision and Pattern Recognition, Jun. 13, 2020, pp. 11983-11992.
Lin, et al., "BARF: Bundle-Adjusting Neural Radiance Fields", In Proceedings of the IEEE/CVF International Conference on Computer Vision, Oct. 10, 2021, pp. 5741-5751.
Lindenberger, et al., "Pixel-Perfect Structure-From-Motion With Featuremetric Refinement", In Proceedings of the IEEE/CVF International Conference on Computer Vision, Oct. 10, 2021, pp. 5987-5997.
Lowe, Davidg. , "Distinctive Image Features from Scale-Invariant Keypoints", In International Journal of Computer Vision, vol. 60, Issue 2, Jan. 22, 2004, pp. 91-110.
Mackay, et al., "Bayesian Neural Networks and Density Networks", In Journal of Nuclear Instruments and Methods in Physics Research Section A: Accelerators, Spectrometers, Detectors and Associated Equipment, vol. 354, No. 1, Jan. 15, 1995, pp. 73-80.
Massiceti, et al., "Random forests versus Neural Networks—What's best for camera localization?", In Proceedings of International Conference on Robotics and Automation, May 29, 2017, pp. 5118-5125.
Max, et al., "Optical Models for Direct Volume Rendering", In Journal of IEEE Transactions on Visualization and Computer Graphics, vol. 1, Issue 2, Jun. 1995, pp. 99-108.
Meng, et al., "Backtracking regression forests for accurate camera relocalization", In Proceedings of IEEE/RSJ International Conference on Intelligent Robots and Systems, Sep. 24, 2017, pp. 6886-6893.
Meng, et al., "Exploiting Points and Lines in Regression Forests for RGB-D Camera Relocalization", In Proceedings of IEEE/RSJ International Conference on Intelligent Robots and Systems, Oct. 1, 2018, pp. 6827-6834.
Mildenhall, et al., "NeRF: Representing Scenes as Neural Radiance Fields for View Synthesis", In Journal of Communications of the ACM, vol. 65, Issue 1, Dec. 17, 2021, pp. 99-106.
Moreau, et al., "LENS: Localization Enhanced by NeRF Synthesis", In Proceedings of the 5th Conference on Robot earning, Jan. 11, 2022, pp. 1347-1356.
Müller, et al., "Instant Neural Graphics Primitives with a Multiresolution Hash Encoding", In Journal of ACM Transactions on Graphics, vol. 41, No. 4, Jul. 2022, 15 Pages.
Ng, et al., "Reassessing the Limitations of CNN Methods for Camera Pose Regression", In Repository of arXiv:2108.07260v1, Aug. 16, 2021, pp. 1-15.
Pan, et al., "ActiveNeRF: Learning Where to See with Uncertainty Estimation", In Proceedings of 17th European Conference on Computer Vision, Oct. 23, 2022, pp. 230-246.
Pathak, et al., "Self-Supervised Exploration via Disagreement", In Proceedings of the 36th International Conference on Machine Learning, Jun. 9, 2019, 10 Pages.
Reiser, et al., "KiloNeRF: Speeding Up Neural Radiance Fields With Thousands of Tiny MLPs", In Proceedings of the IEEE/CVF International Conference on Computer Vision, Oct. 10, 2021, pp. 14335-14345.
Rematas, et al., "Urban Radiance Fields", In Proceedings of the IEEE/CVF Conference on Computer Vision and Pattern Recognition, Jun. 18, 2022, pp. 12932-12942.
Riegler, et al., "Free View Synthesis", In Proceedings of European Conference on Computer Vision, Nov. 13, 2020, pp. 623-640.
Roessle, et al., "Dense Depth Priors for Neural Radiance Fields From Sparse Input Views", In Proceedings of the IEEE/CVF Conference on Computer Vision and Pattern Recognition, Jun. 18, 2022, pp. 12892-12901.

(56) References Cited

OTHER PUBLICATIONS

Rosinol, et al., "NeRF-SLAM: Real-Time Dense Monocular SLAM with Neural Radiance Fields", In Repository of arXiv:2210.13641v1, Oct. 24, 2022, 10 Pages.
Sarlin, et al., "Back to the Feature: Learning Robust Camera Localization From Pixels To Pose", In Proceedings of the IEEE/CVF conference on computer vision and pattern recognition, Jun. 19, 2021, pp. 3247-3257.
Sarlin, et al., "From Coarse to Fine: Robust Hierarchical Localization at Large Scale", in Proceedings of the IEEE/CVF Conference on Computer Vision and Pattern Recognition, Jun. 16, 2019, pp. 12716-12725.
Sarlin, et al., "SuperGlue: Learning Feature Matching With Graph Neural Networks", In Proceedings of the IEEE/CVF Conference on Computer Vision and Pattern Recognition, Jun. 13, 2020, pp. 4938-4947.
Sattler, et al., "Efficient & Effective Prioritized Matching for Large-Scale Image-Based Localization", In Journal of IEEE Transactions on Pattern Analysis and Machine Intelligence vol. 39, Issue 9, Sep. 20, 2016, pp. 1744-1756.
Sattler, et al., "Image Retrieval for Image-Based Localization Revisited", In Journal of BMVC, vol. 1, No. 2, Sep. 3, 2012, pp. 1-12.
Sattler, et al., "Improving Image-Based Localization by Active Correspondence Search", In Proceedings of European Conference on Computer Vision, Oct. 7, 2012, pp. 752-765.
Sattler, et al., "Understanding the Limitations of CNN-Based Absolute Camera Pose Regression", In Proceedings of the IEEE/CVF Conference on Computer Vision and Pattern Recognition, Jun. 16, 2019, pp. 3302-3312.
Seitzer, et al., "On the Pitfalls of Heteroscedastic Uncertainty Estimation with Probabilistic Neural Networks", In Repository of arXiv:2203.09168v1, Mar. 17, 2022, pp. 1-24.
Sensoy, et al., "Evidential Deep Learning to Quantify Classification Uncertainty", In Journal of Advances in Neural Information Processing Systems, vol. 31, Dec. 3, 2018, pp. 1-11.
Seung, et al., "Query by Committee", In Proceedings of the Fifth Annual Workshop on Computational Learning Theory, Jul. 1, 1992, pp. 287-294.
Shavit, et al., "Learning Multi-Scene Absolute Pose Regression With Transformers", In Proceedings of the IEEE/CVF International Conference on Computer Vision, Oct. 10, 2021, pp. 2733-2742.
Shen, et al., "Conditional-Flow NeRF: Accurate 3D Modelling with Reliable Uncertainty Quantification", In Proceedings of Computer Vision-ECCV, 17th European Conference, Oct. 23, 2022, pp. 540-557.
Shen, et al., "Stochastic Neural Radiance Fields: Quantifying Uncertainty in Implicit 3D Representations", In Proceedings of International Conference on 3D Vision, Dec. 1, 2021, pp. 972-981.
Shotton, et al., "Scene Coordinate Regression Forests for Camera Relocalization in RGB-D Images", In Proceedings of the IEEE Conference on Computer Vision and Pattern Recognition, Jun. 23, 2013, pp. 2930-2937.
Simonyan, et al., "Very Deep Convolutional Networks for Large-Scale Image Recognition", In Repository of arXiv:1409.1556v6, Apr. 10, 2015, 14 Pages.
Simonyan, et al., "Very Deep Convolutional Networks for Large-Scale Image Recognition", In Repository of arXiv:1409.1556v1, Sep. 4, 2014, pp. 1-10.
Srinivasan, et al., "NeRV: Neural Reflectance and Visibility Fields for Relighting and View Synthesis", In Proceedings of the IEEE/CVF Conference on Computer Vision and Pattern Recognition, Jun. 19, 2021, pp. 7495-7504.
Straub, et al., "The Replica Dataset: A Digital Replica of Indoor Spaces", In Repository of arXiv:1906.05797v1, Jun. 13, 2019, 10 Pages.
Sucar, et al., "iMAP: Implicit Mapping and Positioning in Real-Time", In Proceedings of Proceedings of the IEEE/CVF International Conference on Computer Vision, 2021, pp. 6229-6238.
Sun, "Direct Voxel Grid Optimization: Super-Fast Convergence for Radiance Fields Reconstruction", In Proceedings of the IEEE/CVF Conference on Computer Vision and Pattern Recognition, Jun. 18, 2022, pp. 5459-5469.
Sun, et al., "LoFTR: Detector-Free Local Feature Matching With Transformers", In Proceedings of the IEEE/CVF Conference on Computer Vision and Pattern Recognition, Jun. 19, 2021, pp. 8922-8931.
Taira, et al., "InLoc: Indoor Visual Localization With Dense Matching and View Synthesis", In Proceedings of the EEE Conference on Computer Vision and Pattern Recognition, Jun. 18, 2018, pp. 7199-7209.
Tancik, et al., "Block-NeRF: Scalable Large Scene Neural View Synthesis", In Proceedings of the IEEE/CVF Conference on Computer Vision and Pattern Recognition, Jun. 18, 2022, pp. 8248-8258.
Tang, et al., "Learning Camera Localization via Dense Scene Matching", In Proceedings of the IEEE/CVF Conference on Computer Vision and Pattern Recognition, Jun. 19, 2021, pp. 1831-1841.
Torii, et al., "24/7 Place Recognition by View Synthesis", In Proceedings of the IEEE Conference on Computer Vision and Pattern Recognition, Jun. 7, 2015, pp. 1808-1817.
Turki, et al., "Mega-NERF: Scalable Construction of Large-Scale NeRFs for Virtual Fly-Throughs", In Proceedings of the IEEE/CVF Conference on Computer Vision and Pattern Recognition, Jun. 18, 2022, pp. 12922-12931.
Valentin, et al., "Exploiting Uncertainty in Regression Forests for Accurate Camera Relocalization", In Proceedings of the IEEE Conference on Computer Vision and Pattern Recognition, Jun. 7, 2015, pp. 4400-4408.
Valentin, et al., "Learning to Navigate the Energy Landscape", In Proceedings of Fourth International Conference on BD Vision (3DV), Oct. 25, 2016, pp. 323-332.
Walch, et al., "Image-Based Localization Using LSTMs for Structured Feature Correlation", In Proceedings of the EEE International Conference on Computer Vision, Oct. 22, 2017, pp. 627-637.
Wang, et al., "AtLoc: Attention Guided Camera Localization", In Proceedings of the AAAI Conference on Artificial Intelligence, Apr. 3, 2020, pp. 10393-10401.
International Preliminary Report on Patentability (Chapter I) received for PCT Application No. PCT/US2024/019329, mailed on Oct. 9, 2025, 11 pages.

\* cited by examiner

GENERATING IMAGES FOR NEURAL NETWORK TRAINING

BACKGROUND

Neural network training is generally computationally expensive and time consuming especially where training examples are images. Yet there are cases where many neural networks are to be trained, each for a particular situation, and this rapidly increases the amount of training to be done. One approach is to make more computing resources available in order to carry out the neural network training. However, this can be energy and carbon intensive.

The embodiments described below are not limited to implementations which solve any or all of the disadvantages of known ways of generating neural network training data.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A neural network can be trained to assist in a process of visual localization within a scene. By using a neural radiance field to generate images such neural networks can be trained efficiently whilst being high performing.

A plurality of training examples is accessed, each training example comprising a color image of a scene, a depth image of the scene, and a pose of a viewpoint from which color image and depth image were captured. A neural radiance field is trained using the training examples. A plurality of generated images is computed, by, for each of a plurality of randomly selected viewpoints, generating a color image and a depth image of the scene from the neural radiance field. A neural network is trained using the generated images.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above there are cases where many neural networks are to be trained, each for a particular situation, and this rapidly increases the amount of training to be done. One such case is visual localization whereby images are captured by a moving entity in a scene and used to localize the entity within the scene by computing a 3D position and orientation of the entity with respect to a 3D map of the scene. Generally, a neural network used as part of a visual localization process is trained for a particular scene. In order to perform visual localization throughout many scenes one option is to train many neural networks, each for a different scene. A scene is an environment and a non-exhaustive list of examples of types of scenes is: office, living room, games room, kitchen, laboratory. Within a given type of scene there are many instances since typically each particular instance of a scene is unique.

The inventors have realized a desire for particularly efficient and effective neural network training where a neural network is to be trained for use in a visual localization process. This enables rapid deployment of visual localization functionality for new scenes or for existing scenes which change. Neural networks may be used in visual localization processes to predict correspondences between 2D image points captured by a mobile capture device, and 3D positions in the scene. Given a plurality of correspondences (such as three, four or more) it is possible to use a perspective n point solver to compute the 3D position and orientation of the mobile capture device in the scene. Neural networks which predict correspondences between 2D image points and 3D positions are referred to as scene coordinate regression networks. A perspective n point solver is a process for estimating the pose of a camera given three or more 3D points in a scene and their corresponding 2D projections in an image of the scene. Perspective n point solvers are widely available as open source processes.

In order to train a neural network, such as a scene coordinate regression network, for use in visual localization large amounts of training data are typically used (such as thousands of training examples). Training data is difficult and costly to obtain as a training example is a pose of a camera (3D position and orientation of the camera) as well as a color image of a scene captured with the camera at that pose and a corresponding depth image of the scene captured with the camera at that pose. A major bottleneck is the required vast amount of training data. The inventors have developed a way to generate these types of training examples using a neural radiance field. A neural radiance field is a type of neural network that can generate novel views of a complex 3D scene, based on a partial set of 2D images of the scene. A neural radiance field represents a scene as a continuous volume by parameterizing a radiance field and density distribution with a multilayer perceptron and uses volume rendering to synthesize images.

A method comprises accessing a plurality of training examples, each training example comprising a color image of a scene, a depth image of the scene and a pose (3D position and orientation) of a viewpoint from which the color image and the depth image were captured. A neural radiance field is trained using the training examples. Neural radiance fields can be trained in an efficient manner. Once trained, the neural radiance field is used to compute a plurality of generated images, for each of a plurality of randomly selected viewpoints, a color image and a depth image of the scene are generated from the neural radiance field. This gives a powerful way to generate lots of images from a wide variety of different viewpoints. A neural network is trained using the generated images. Because the generated images are from a wide variety of viewpoints it is possible to obtain good generalization ability of the resulting trained neural network; that is, the neural network is able to predict correspondences accurately even for captured images that were captured from viewpoints unobserved in the training data. Training the neural network comprises training the neural network with the generated images such that the neural network is able to predict correspondences between two dimensional 2D image elements of an image of the scene and three-dimensional 3D locations in a map of the scene comprising a 3D point cloud. Where a map of the scene has been formed from depth images of the scene to create a 3D point cloud this is particularly useful. Thus the neural network is trained to be able to predict correspondences which can be used for visual localization as now explained.

Visual localization can be performed by receiving an image captured by a mobile image capture device in the scene. A plurality of correspondences is computed by inputting the received image to the neural network. A 3D position and orientation of the mobile image capture device with respect to the map is then computed by inputting the correspondences to a perspective n point solver. This gives a robust and effective way to localize a mobile capture device in a scene such as an office, living room or other scene.

The neural network may be pre-trained using the plurality of training examples. Pre-training is found to be effective and makes good use of the available training data which is also used to train the neural radiance field.

The inventors have recognized that it is not straightforward to use neural radiance fields (NeRFs) to generate images for training a scene coordinate regression network. This is because NeRF rendered images usually contain artifacts that may mislead or confuse the network during training. The inventors have developed various ways to mitigate or ameliorate the effects of such artifacts.

For each of the plurality of generated images, a color uncertainty map is computed from the neural radiance field. The operation of training the neural network comprises omitting one of the generated images, according to the color uncertainty map of the omitted image indicating uncertainty over a threshold. Omitting generated images reduces the amount of training and making the omission according to the color uncertainty map enables generated images which are unlikely to improve performance of the neural network to be omitted. Effects of artifacts in NeRF rendered images are also mitigated.

The inventors have recognized that by training a NeRF in a particular way it can be configured to output uncertainty data. The neural radiance field is trained, in some examples, using a negative log-likelihood loss with a variance-weighting term on color output of the neural radiance field. This loss is found to result in a neural network with good scene coordinate regression performance and where uncertainty data about predictions of color values is available.

In some examples the variance-weighting term of the loss is an adaptive learning rate. Having an adaptive learning rate is beneficial since it promotes efficiency by enabling a rate of learning to vary according to a level of uncertainty of the generated images. In some cases, the variance-weighting term comprises a parameter allowing for interpolation between a negative log-likelihood loss and a mean squared error loss which enables accuracy to be improved.

For each of the plurality of generated images, a depth uncertainty map is computed from the neural radiance field. The depth uncertainty map helps with technical efficiency. For example, the operation of training the neural network comprises omitting one of the generated images according to the depth uncertainty map of the omitted image indicating uncertainty over a threshold. In this way the amount of training to be done is reduced (hence reduced consumption of computing resources) whilst retaining performance of the final trained neural network. The effect of artifacts in NeRF generated images is also mitigated.

A particular loss function is beneficial in some cases. For example, the neural radiance field may be trained using a Gaussian negative log-likelihood loss on depth output of the neural radiance field. In an example the loss is computed as the sum over rays projected into the neural radiance field to generate an image of: the logarithm of the square of the standard deviation of the predicted depth for the ray plus the square of the L2 difference between the predicted depth of the ray minus the actual depth of the ray, divided by the square of the standard deviation of the predicted depth for the ray. These types of loss function are found to be effective for training the neural radiance field and also enables uncertainty values for depth to be computed.

To make training more effective it is possible to remove images with depth smaller than a specified threshold. This may be done by, for each of the plurality of generated images, inspecting depth values of the generated image; and where the operation of training the neural network comprises omitting one of the generated images according to the depth values being below a threshold. This mitigates effects of NeRF generated image artifacts.

Training the neural radiance field using a loss function having a color term and a depth term is found to be effective. By using separate terms for the color loss and depth loss improvements in performance are found. A key observation of the inventors is that uncertainties of the color and depth images present quite different distributions and so it is beneficial to model them separately using separate color and depth loss terms.

In many examples, the neural network outputs, for each predicted correspondence, an uncertainty value. The uncertainty is useful for informing downstream processes or for informing selection of generated images to use in training. In examples, the uncertainty value for each predicted correspondence is computed by predicting hyperparameters of a normal inverse-gamma distribution. Using a normal inverse-gamma distribution is one of several options and is found to be useful for approximating a posterior distribution.

The inventors have found a way to select which images generated by the neural radiance field will be most useful for training. Correspondences having associated uncertainty values are predicted from the generated images using the neural network. It is then possible to omit generated images where the uncertainty values are higher than a threshold.

Effort and resource can then be focused on training using images which will bring improvement in performance.

The inventors have recognized that the depth and color uncertainties can be taken into account at a pixel level. This fine granularity of control enables improved efficiency. Prior to training the neural network using the generated images, correspondences are predicted having associated uncertainty values from the generated images using the neural network. Training the neural network is done using a loss function having terms which weigh pixels according to color uncertainty and depth uncertainty. This mitigates the effects of NeRF introduced image artifacts as well as giving efficiency.

Figure 1:
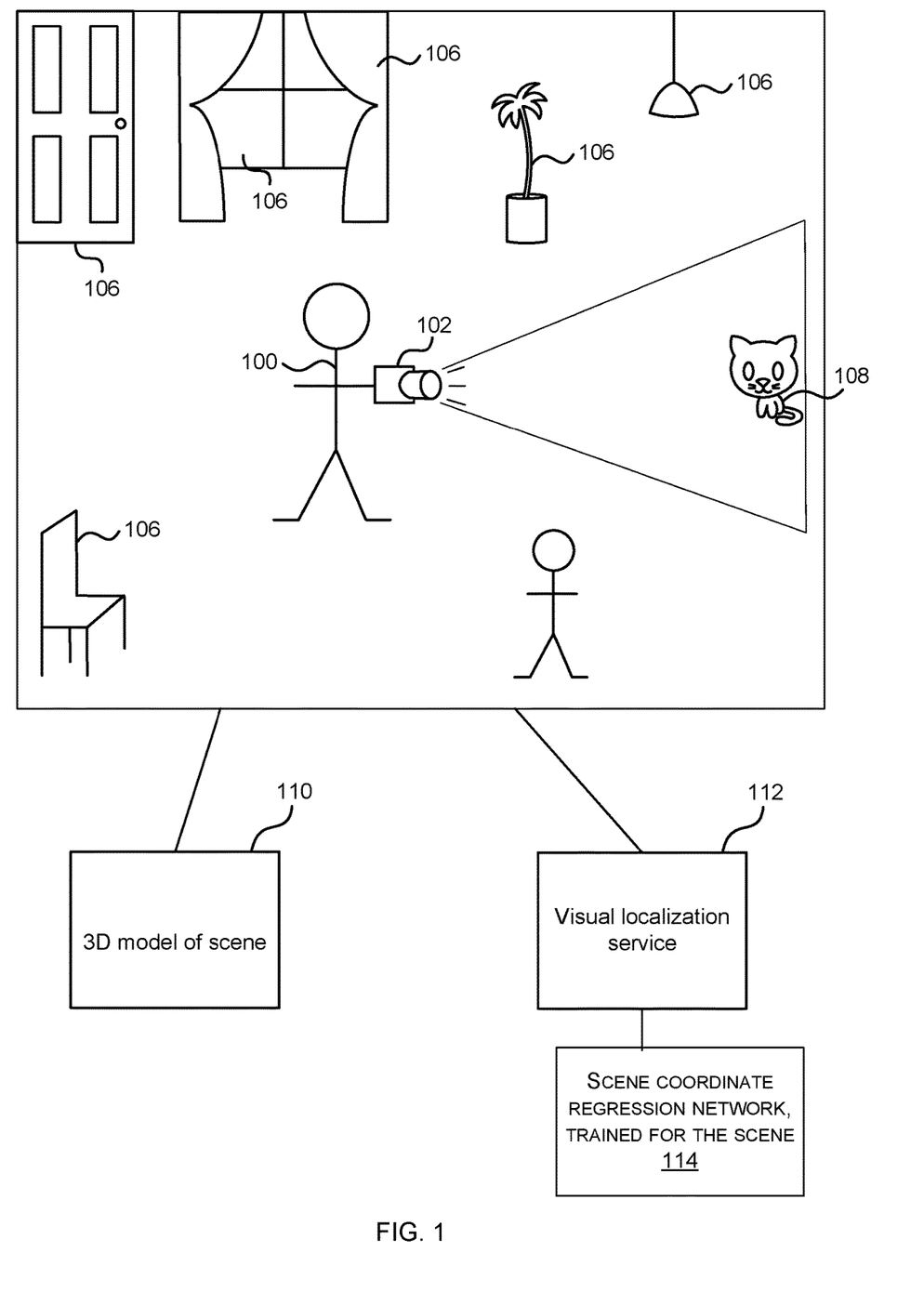
FIG. 1 shows a mobile image capture device in a scene and where the mobile image capture device is in communication with a visual localization service.

FIG. 1 shows a mobile image capture device 102 in a scene and where the mobile image capture device 102 is in communication with a visual localization service 112.

In the example of FIG. 1 the mobile image capture device 102 is a hand held camera and a user 100 is holding the camera and moving in a scene which in the example of FIG. 1 is a domestic living room. The domestic living room comprises objects 106 and surfaces such as a floor, walls and ceiling. As the user operates the mobile image capture device 102 and moves in the scene, images of the scene are captured. In the example of FIG. 1 the mobile image capture device 102 is capturing an image of a cat 108 in the scene. A captured image may be sent to a visual localization service 112 which uses the image to determine a 3D position and orientation of the mobile image capture device 102 with respect to a 3D model 110 of the scene. The visual localization service 112 may be at a remote computing entity such as in the cloud, or may be deployed at a personal computer in the home of the user, at a companion device of the mobile image capture device 102, in the mobile image capture device 102 itself, or at any other computing entity in communication with the mobile image capture device 102. The functionality of the visual localization service 112 is shared between the mobile image capture device 102 and another computing entity in some cases.

In the example of FIG. 1 the mobile image capture device 102 is a hand held camera. However, other forms of mobile image capture device 102 are usable, such as an image capture device in a motor vehicle, an aerial vehicle, an unmanned vehicle, a head worn computing device or other mobile image capture device 102.

The 3D model 110 is stored at a memory, database or other store accessible to the visual localization service. The 3D model 110 is a 3D point cloud, or a mesh model or any other 3D model of the scene. In some cases the 3D model 110 is created by capturing depth images of the scene and using an iterative closest point algorithm to form a 3D point cloud from the depth images.

The visual localization service 112 uses a scene coordinate regression model that has been trained for the scene 114 using training images generated by a neural radiance field. By using a neural radiance field, it is possible to generate large quantities of training images in an efficient way for a wide variety of virtual camera poses or viewpoints.

Once the 3D position and orientation of the mobile capture device 102 is obtained from the visual localization service 112 it is used for any of a range of possible purposes. A non-exhaustive list of example purposes is: controlling motion of the mobile image capture device 102 in the scene, computing holograms for display by the mobile image capture device 102, route planning, coordination with other mobile image capture devices 102 in the scene, controlling a computer game, virtual reality applications, augmented reality applications.

Using a neural radiance field to generate training images enables rapid creation and deployment of a scene coordinate regression network as part of a visual localization service for a particular scene.

By using a neural radiance field to generate training images it is possible to improve the functioning of the underlying visual localization service.

Alternatively, or in addition, the functionality of the visual localization service 112, or functionality to generate training images described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
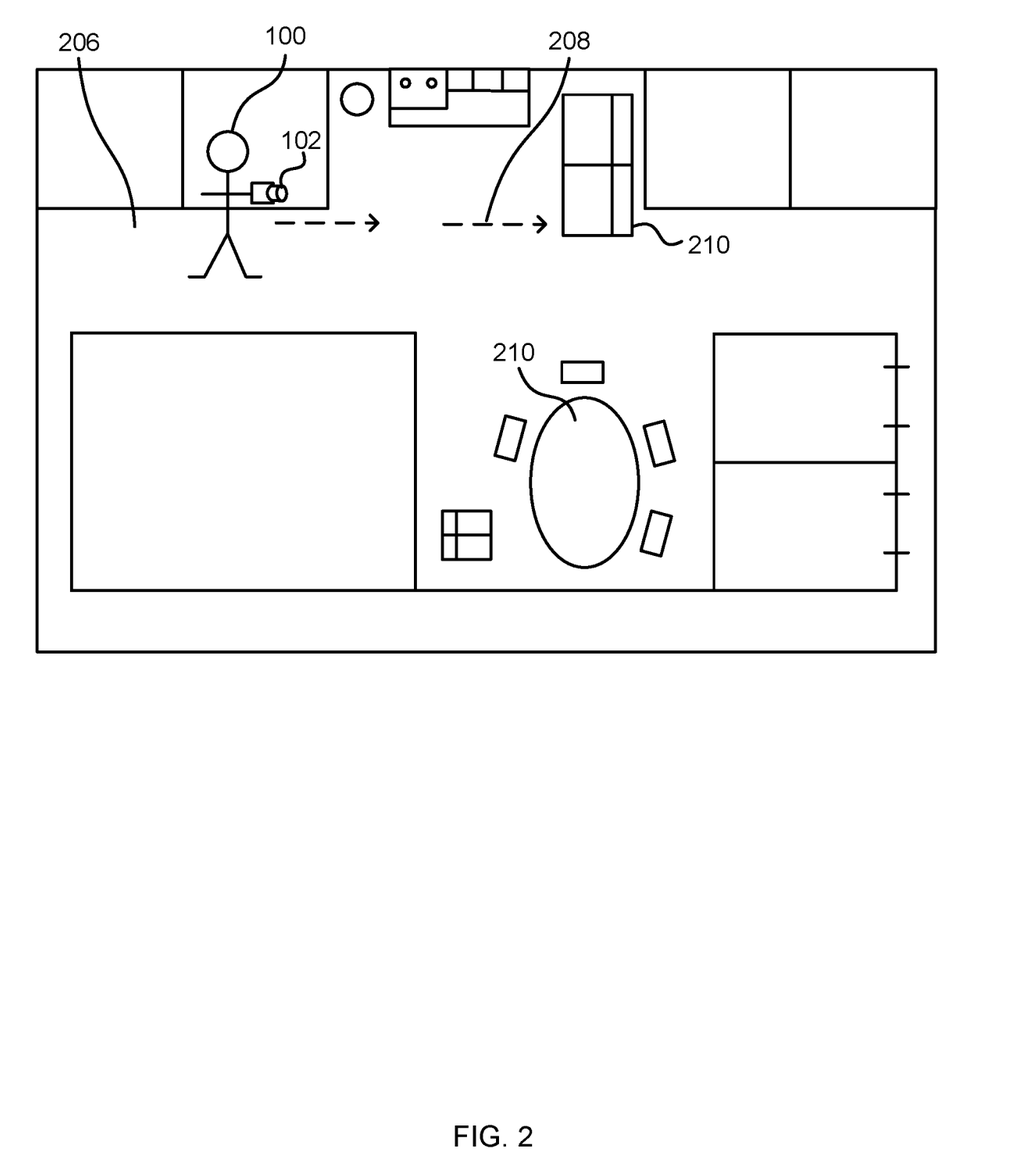
FIG. 2 shows the mobile image capture device of FIG. 1 in another scene.

FIG. 2 shows the mobile image capture device 102 of FIG. 1 in another scene such as an office. FIG. 2 is a plan view and shows a person 100 holding the mobile image capture device 102 and walking along a corridor 206 as indicated by dotted arrows 208. In the scene are objects 210 such as walls, seating, a table. As the person walks images of the scene are captured by mobile image capture device 102 and sent to the visual localization service 112. The visual localization service 112 uses the captured images to track a pose (3D position and orientation) of the mobile image capture device 102 with respect to a 3D model of the scene. Because the scene in FIG. 2 is different from the scene in FIG. 1, one neural network per scene may be used as part of the visual localization service 112. The inventors have found a way to rapidly train and deploy a neural network for a particular scene.

Figure 3:
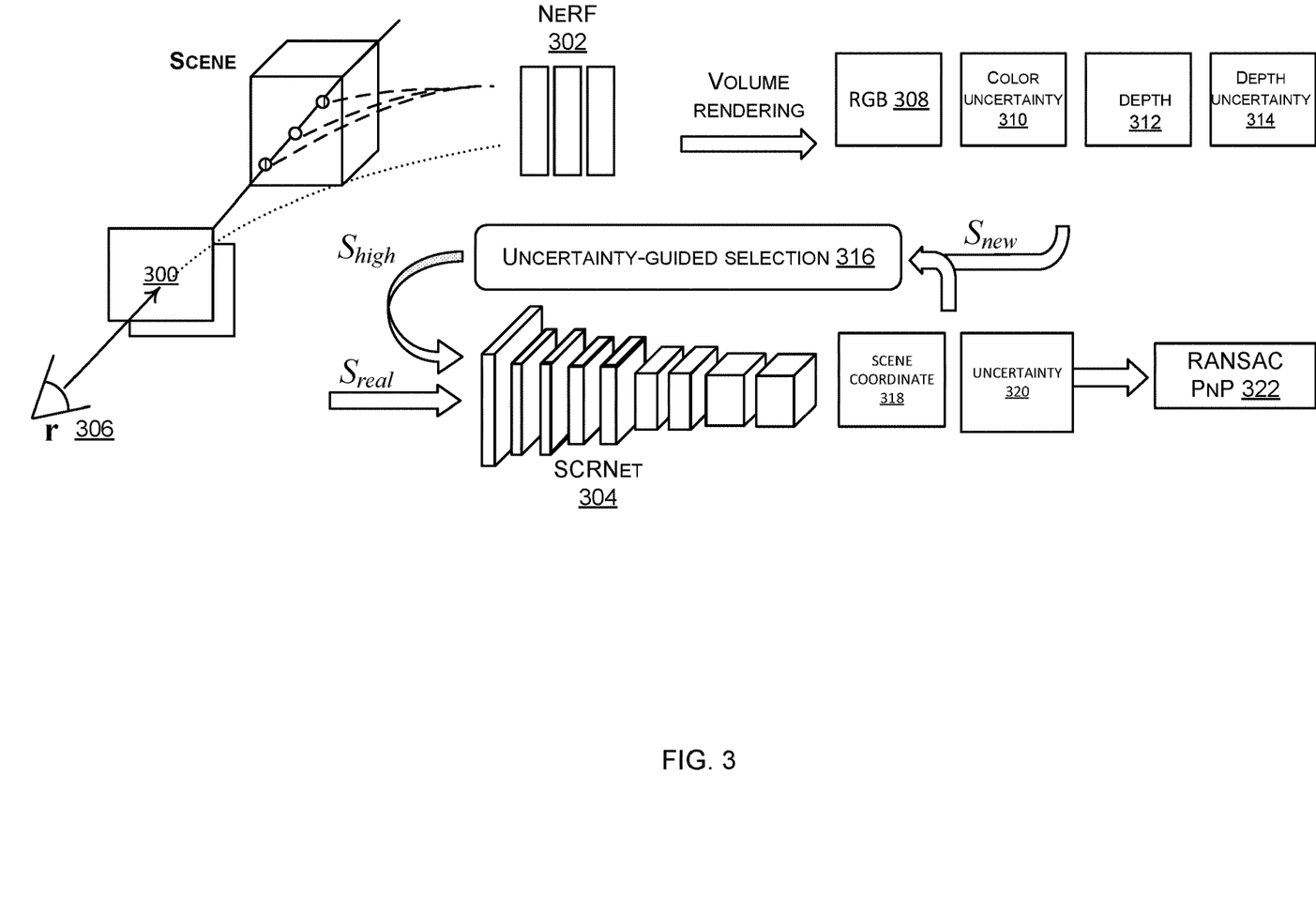
FIG. 3 is a schematic diagram of a process for generating images to train a neural network for use in a visual localization service.

FIG. 3 is a schematic diagram of a process for generating images to train a neural network for use in a visual localization service. In the example of FIG. 3 a limited amount of real data 300 is available comprising a plurality of training examples (such as tens of training examples). Each training example comprises a color image of a scene, a corresponding depth image of the scene, and a pose of a viewpoint of a camera which captured the color image and the depth image. The scene coordinate map is a two-dimensional array where an element of the array corresponds to an element of the color and depth images. Each element in the scene coordinate map comprises a 3D location in the scene. The training examples are obtained empirically such as by using a capture device with a known position and orientation to capture the training examples. The position and orientation of the capture device is known from sensors such as accelerometers, gyroscopes, inertial measurement units, global positioning system sensor or other sensors in the capture device. The capture device is a color camera and depth camera so as to capture color and depth images.

The limited amount of real data 300 is used to train both a neural radiance field 302 and a scene coordinate regression network 304. Any well-known supervised training process is used such as backpropagation.

In a non-limiting example, the neural radiance field 302 is a multi-layer perceptron with around ten fully connected layers and where each layer has 256 neurons and rectified linear unit (ReLU) activations. The output of the final layer is passed through a single layer with softplus activation to predict a density value. The final layer output is passed through a 256 channel fully connected layer without activation and then concatenation with the viewing direction to feed into a 128 channel layer with ReLU activation which outputs color features. The color feature is then taken by the final layer to produce the color. An additional fully connected layer with softplus activation takes color features as input and predicts the color variance. During optimization, randomly sample a batch of rays from each image per epoch and use the Adam optimizer.

The neural radiance field 302 is used to generate a plurality of images of the scene from a variety of different viewpoints or poses of a virtual camera 306. In the example of FIG. 3 a color image 308 and a corresponding depth image 312 are generated by the neural radiance field 302. The neural radiance field optionally generates color uncertainty map 310 which is a 2D array where elements of the array store numerical values indicating uncertainty of a color value at a corresponding location in the color image 308. The neural radiance field optionally generates depth uncertainty map 314 which is a 2D array where elements of the array store numerical values indicating uncertainty of a depth value at a corresponding location in the depth image 312. FIG. 3 shows an example output from the neural radiance field for a single virtual camera 306 pose. Hundreds or more such outputs are computed each output being for a different known virtual camera 306 pose. The virtual camera poses are selected at random or by using rules to generate virtual camera poses spread around and in the scene. In some examples the virtual camera poses are generated by perturbing camera poses of a real dataset; for a given real camera pose, add multiple random translations and rotations to it to obtain multiple virtual camera poses.

In some examples, such as where the color uncertainty map 310 and the depth uncertainty map 314 are unavailable, all the generated color image 308 and depth image 312 pairs (labelled with the known virtual camera poses) are used to train the scene coordinate regression network 304.

In other examples, uncertainty guided selection 316 is used to filter out some of the generated color image 308 and depth image 312 pairs. In this way informed selection of generated images which will improve performance of the scene coordinate regression network 304 is achieved and efficacy is gained since the number of training images to be processed during training is reduced. The uncertainty guided selection 316 takes into account one or more of: the color uncertainty map 310, the depth uncertainty map 314, uncertainty 320 from the scene coordinate regression network. The guided selection picks the most informative images from the generated data, which hugely reduces redundancies in a training set and significantly improves training efficiency.

The scene coordinate regression network 304 may be any scene coordinate regression network such as any currently available open source scene coordinate regression network. That is, the present technology is designed to work with any scene coordinate regression network. An example of one scene coordinate regression network which may be used is now given to aid understanding of the technology although it is not intended to be limiting.

In a non-limiting example, the scene coordinate regression network is a regression neural network with a plurality of layers (such as tens or hundreds of layers). A regression neural network object is a feedforward neural network with fully connected layers. A first fully connected layer of the neural network takes sensor data as input (such as a color image and a corresponding depth image), and each subsequent layer has a connection from the previous layer. Each fully connected layer multiplies the input by a weight matrix (where the weights in the weight matrix are weights of the nodes in the layer) and then adds a bias vector. An activation function follows each fully connected hidden layer. A final fully connected layer produces the network's output, namely predicted 3D scene coordinates. The first to middle layers serve as a feature extractor and the rest of the layers serve as a coordinate regressor.

The scene coordinate regression network outputs, for an individual 2D image elements of a color input image, a scene coordinate (i.e. a 3D position in the scene). A 2D image element and corresponding 3D position is referred to as a correspondence. In FIG. 3 there is a schematic illustration of the predicted scene coordinates 318 in a 2D array. Optionally the scene coordinate regression network is configured to output, for each predicted correspondence, an uncertainty value. In FIG. 3 the uncertainty values 320 are illustrated schematically in the form of a 2D array. The uncertainty value for each predicted correspondence may be computed by predicting hyperparameters of a normal inverse-gamma distribution that approximates a posterior distribution as explained in more detail below. The predicted correspondences are input to a perspective n point solver 322 which, in the case of FIG. 3, is a random sample consensus RANSAC perspective n point solver.

Color images 308 generated by the neural radiance field 302 are optionally input to the scene coordinate regression network 304 which produces uncertainty values 320. Color images 308 which have uncertainty 320 above a threshold are omitted from use in training in some examples. In this way an amount of training is reduced without detrimenting performance of the resulting trained scene coordinate regression network.

FIG. 3 shows a novel pipeline that leverages NeRF to address the aforementioned challenges of learning-based scene coordinate regression methods. Train a NeRF to render RGB-D data together with color and depth uncertainties. The rendered data are used to train the scene coordinate regression network, where the uncertainties are first used to filter out badly rendered images and then weigh different pixels in the regression learning losses. Formulate scene coordinate regression from an evidential deep learning perspective to model uncertainty over the predicted 3D coordinates. An uncertainty-guided novel views selection policy is optionally used to select samples that bring the most information gain and promote the network performance with the highest efficiency. As a result, the method of FIG. 3 only requires a small portion of training data (real+rendered) and can deliver comparable or even better performances than its counterpart trained on a full training set. The method to separately models color and depth uncertainties for NeRF and utilizes them for scene coordinate regression learning. By formulating scene coordinate regression as evidential deep learning an uncertainty-guided policy is possible to actively select the data rendered by NeRF to gain model evidence. The method is orthogonal to scene coordinate regression networks and can serve as a plug-and-play module.

Figure 4:
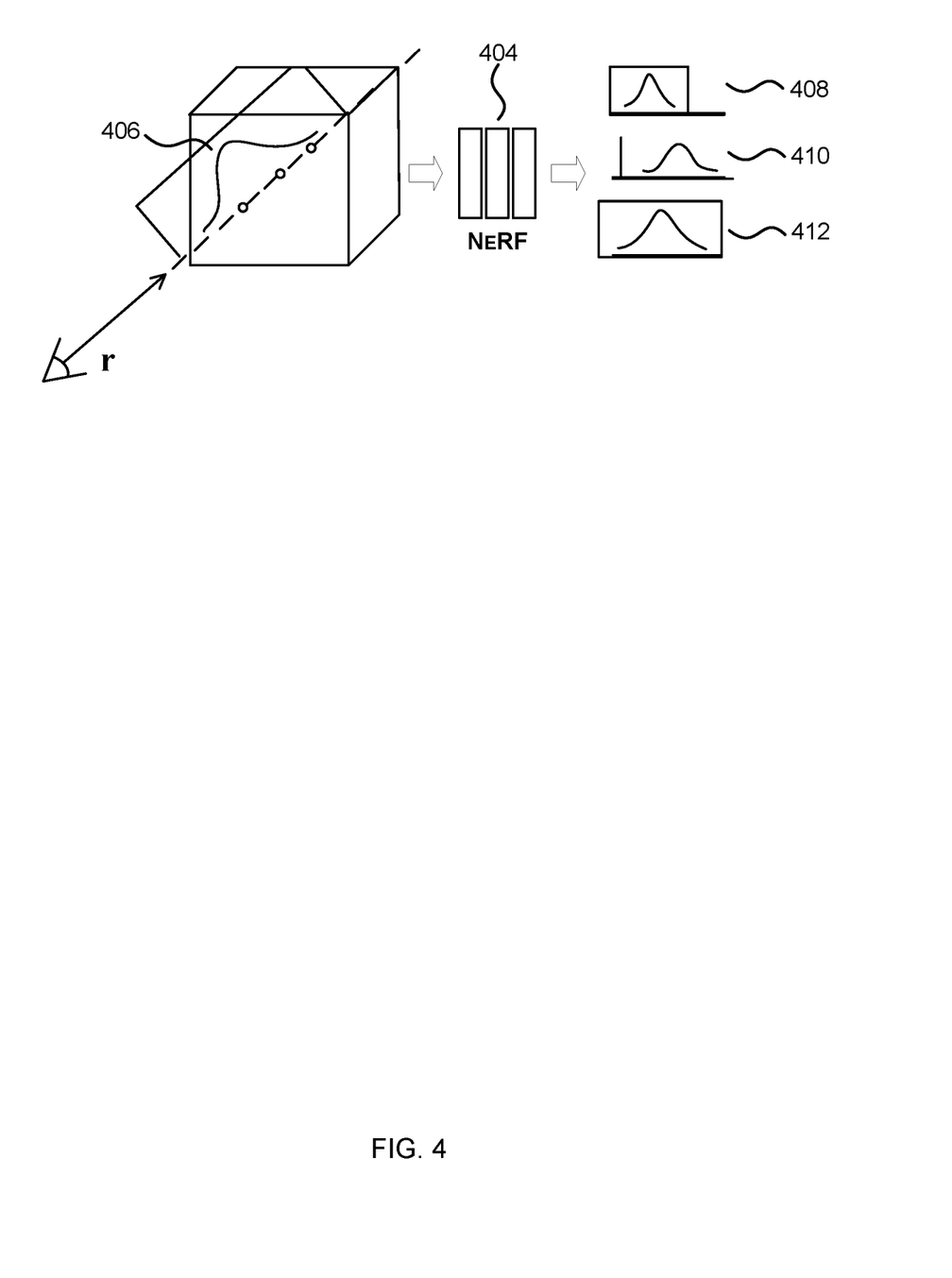
FIG. 4 is a schematic diagram of a neural radiance field.

FIG. 4 is a schematic diagram of a neural radiance field 404 which is an example of neural radiance field 302 of FIG. 3 in some cases. The neural radiance field is configured to output uncertainty values indicating uncertainty of predictions computed by the neural radiance field. The uncertainty information is useful to guide how the predictions from the neural radiance field are used and alleviate the influence of artifacts in the predictions from the neural radiance field. FIG. 4 illustrates how the distribution of a scene point's radiance value is assumed to be Gaussian and the distribution of a rendered pixel color is the weighted sum of Gaussian 408, 410, which is still a Gaussian 412. A ray termination distribution 406 is also modelled as a Gaussian distribution.

Figure 5:
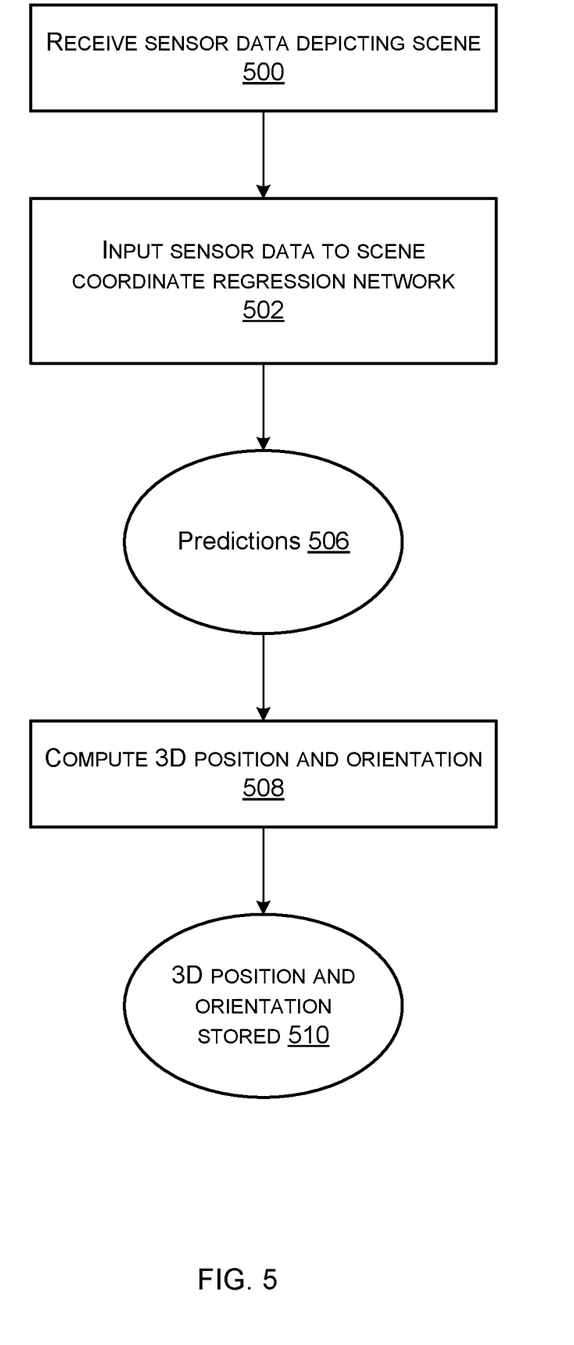
FIG. 5 is a flow diagram of a method of visual localization.

FIG. 5 is a flow diagram of a method of visual localization performed by a visual localization service such as that of FIG. 1. Sensor data depicting a scene is received 500. The sensor data comprises a color image and optionally also a corresponding depth image received from a mobile image capture device 102. The sensor data is input 502 to a scene coordinate regression network such as that of FIG. 3 which computes predictions 506. The predictions comprise correspondences between 2D image elements of the color image and 3D positions in the scene. The predicted correspondences are input to a perspective n point solver which computes 508 a 3D position and orientation of the mobile image capture device 102. The 3D position and orientation is stored 510 and/or made available to another process.

Figure 6:
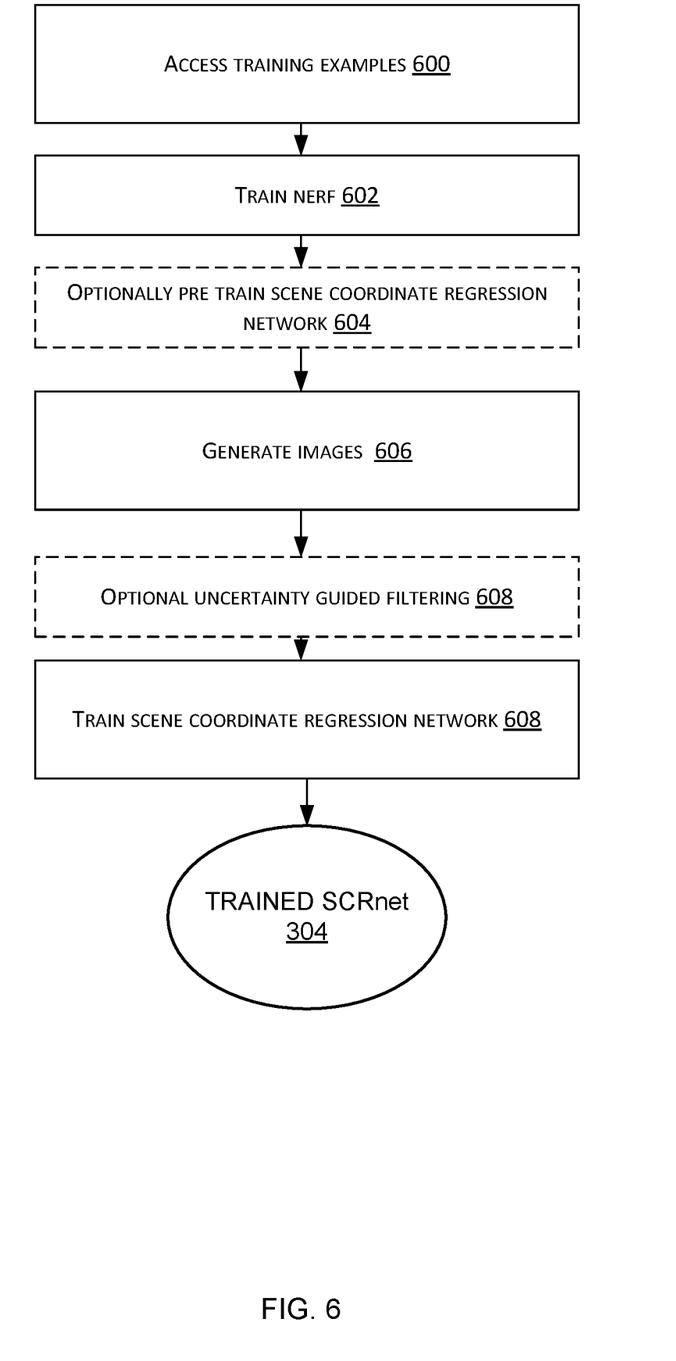
FIG. 6 is a flow diagram of a process for generating images.

FIG. 6 is a flow diagram of a process for generating images.

A NeRF is used to synthesize the "right" data for visual localization for efficient training and decent localization performance. Access 600 a small set of real data $S_{real}$, and train 602 a NeRF model and optionally 604 a scene coordinate regression network with uncertainty estimation. Use NeRF to generate 606 a novel view dataset by synthesizing more views $S_{new}$ within the scene boundary. Optionally prune invalid views using the color and/or depth uncertainties estimated by NeRF. Optionally evaluate the epistemic uncertainty of the scene coordinates in each view in $S_{new}$, select views $S_{high}$ that bring higher information gain, and gather those views together with Sreal to obtain an augmented dataset $S_{aug}$. Train 608 the scene coordinate regression network with $S_{aug}$, thereby increasing localization performance with higher data efficiency. In FIG. 6 the optional pruning and the optional use of epistemic uncertainty is shown in operation 608 as optional uncertainty guided filtering. A trained scene coordinate regression network 304 is thus created and is stored and/or deployed for use in a visual localization service such as that of FIG. 1.

NeRF models the scene as a continuous function using a multilayer perceptron (MLP). Given a 3D position x and a viewing direction d that are transformed using positional encoding $\phi(\cdot)$, the learned implicit function outputs a volume density $\tau$ and a view-dependent RGB color c. To obtain the color of a single pixel, NeRF approximates the volume rendering integral using numerical quadrature with hierarchical stratified sampling. Consider a ray r(t)=o+td emanating from a camera position $o \in \mathbb{R}^3$ with $\|d\|=1$, traversing between near bound $T_n$ and far bound $T_f$ of the scene. Volume rendering computes light radiance by integrating the radiance along the ray. More specifically, the space of interest $[t_n, t_f]$ is partitioned into N bins and samples are drawn uniformly within each bin. The expected color $\hat{C}(r)$ can be approximated by:

$$\hat{C}(r) = \sum_{i=1}^{N} T_i(1 - \exp(-\tau_i \delta_i)) c_i = \sum_{i=1}^{N} w_i c_i \quad (1)$$

where $T_i = \exp(-\Sigma_{j=1}^{i-1} \tau_j \delta_j)$ and $\delta_j = t_{i+1} - t_i$ is the distance between adjacent samples. Note that $\hat{C}(r)$ can be viewed as a weighted sum of color samples $c_i$. NeRF optimizes the continuous function by minimizing the squared reconstruction errors between the rendered pixel color and the ground truth color.

For the NeRF model, encode the scene with an MLP which takes a position x and a viewing direction d as input, and outputs the volume density $\tau$ and radiance color c=(r, g, b). Optionally incorporate uncertainty estimation in the model as explained below. To reduce the training cost, optimize one MLP with depth-guided sampling. During training, half of the samples are drawn from the Gaussian distribution determined by the known depth, and the other half are distributed in the space of interest $[t_n, t_f]$. At test time, the first half of the samples are used to render an approximate depth and variance which determined a Gaussian distribution from which the second half is drawn. In an example, train a NeRF with the following objective function:

$$\mathcal{L}_{overall} = \mathcal{L}_{color} + \lambda \mathcal{L}_{depth} \quad (2)$$

where $\mathcal{L}_{color}$ and $\mathcal{L}_{depth}$ are color and depth losses explained below.

In various examples a neural radiance field is configured to compute uncertainty data about predictions it outputs. An aim is to synthesize new data with NeRF to train a scene coordinate regression network. However, noise, blur, and artifacts often appear in the rendered images. To alleviate their influences, it is useful to estimate the uncertainty of the rendered data.

To estimate color uncertainty, assume that the emitted radiance value of a scene point is sampled from a Gaussian distribution $c_i \sim \mathcal{N}(\bar{c}_i, \bar{\sigma}_{c_i}^2)$. The mean $\bar{c}_i$ is the predicted radiance value and the variance $\bar{\sigma}_{c_i}^2$ captures the uncertainty regarding a certain scene point. Employing a Bayesian learning framework, add an additional branch to predict variance $\bar{\sigma}_{c_i}^2$ after injecting viewing directions:

$$(\tau, \bar{c}, \tilde{\sigma}_{c_i}^2) = MLP_\Theta(\phi(x, d)), \quad (3)$$

where $\Theta$ is the parameter of the MLP network. $\tilde{\sigma}_c^2$ is then processed by a Softplus activation to obtain valid variance: $\bar{\sigma}_c^2 = \log(1 + \exp(\tilde{\sigma}_c^2))$. When performing volume rendering as in Eq.1, the rendered pixel colour can be viewed as a weighed sum of radiance color samples $c_i$. What's more, from Eq.3 see that the radiance value of a scene point on array viewing from a specific direction only depends on its location. Hence, the distributions of different samples scene points on this ray are independent. Assume that the distribution of sampled rays are independent. In this way, it is possible to derive that the rendered pixel color follows a Gaussian distribution:

$$\hat{C} \sim \mathcal{N}(\hat{C}, \hat{\sigma}_{\hat{C}}^2) \sim \mathcal{N}\left(\sum_{i=1}^{N} w_i \bar{c}_i, \sum_{i=1}^{N} w_i^2 \bar{\sigma}_{c_i}^2\right), \quad (4)$$

where each $w_i$ is the same as in Eq.1, and N is the number of sampled points along the ray. $\hat{C}$ and $\hat{\sigma}_c^2$ are the mean and variance of the rendered pixel color.

From a maximum likelihood perspective, optimize the model by minimizing the negative log-likelihood (NLL) loss for sampled rays r:

$$\mathcal{L}_{NLL} = \sum_{r \in \mathcal{R}} \left( \frac{\|C(r) - \hat{C}(r)\|_2^2}{\hat{\sigma}_c^2(r)} + \log \hat{\sigma}_c^2(r) \right), \quad (5)$$

However, minimizing this loss results in sub-optimal mean fits because initially badly-fit regions receive increasingly less weight which leads to premature convergence. To address the ignorance of hard-to-fit regions, optionally add a variance-weighting term $\sigma_c^{2\zeta}$ that it acts as a factor on the gradient $$\mathcal{L}_{color} = \sum\nolimits_{r \in R} \lfloor \hat{\sigma}_c^{2\zeta} \rfloor \mathcal{L}(r) \tag{6}$$

where $\lfloor \bullet \rfloor$ denotes the stop gradient operation which prevents the gradient from flowing through inside the parenthesis, making the variance-weighting term an adaptive learning rate. The parameter (allows for interpolation between the NLL ($\zeta$=0) and MSE ($\zeta$=1) losses while providing well-behaved uncertainty estimates. The notation $\mathcal{L}$ (r) denotes the loss inside the summation of equation 5, that is the loss for sampled ray r is equal to the square of the L2 loss of the actual color for the pixel produced by the ray minus the rendered color for the pixel produced by the ray, divided by the square of the variance of the rendered pixel color produced by the ray, plus the logarithm of the square of the variance of the rendered pixel color produced by the ray.

The volume rendering approximation in Eq.1 can be modified slightly to obtain the expected depth $\hat{z}(r)$ of each ray and its corresponding variance $\hat{\sigma}_z(r)2$ $$\hat{z}(r) = \sum_{i=1}^{N} w_i t_i, \tag{7}$$

$$\hat{\sigma}_z(r)^2 = \sum_{i=1}^{N} w_i (t_i - \hat{z}(r))^2$$

Adding depth supervision improves the quality of the reconstruction and leads to a change in the weight distribution from multimodal to unimodal. Assume the ray termination distribution to be Gaussian $\hat{Z}_i \sim \mathcal{N}(\hat{z}_i, \hat{\sigma}_z(r)^2)$ and adopt a Gaussian negative log-likelihood loss on the depth output:

$$\mathcal{L}_{depth} = \sum\nolimits_{r \in R} \left( \frac{\|\hat{z}(r) - z(r)\|_2^2}{\hat{\sigma}_z(r)^2} + \log \hat{\sigma}_z(r)^2 \right), \tag{8}$$

where z(r) is the target depth. The variance $\hat{\sigma}_z(r)^2$ captures the uncertainty of the rendered depth. Equation 8 is expressed in words as a loss computed as the sum over rays projected from the neural radiance field to generate an image of: the logarithm of the square of the standard deviation of the predicted depth for the ray plus the square of the L2 difference between the predicted depth of the ray minus the actual depth of the ray, divided by the square of the standard deviation of the predicted depth for the ray.

In some examples the scene coordinate regression network is configured to compute uncertainty data. This is useful because the uncertainty data can be used to guide selection of training examples. Training examples which have high uncertainty are useful for training because they give increased information gain to the scene coordinate regression network. One approach to computing uncertainty comprises using Bayesian Neural Networks (BNNs). However, these require expensive sampling during inference. The inventors have developed a way of fast sampling-free uncertainty estimation as now explained.

Assume the observed scene coordinates qi are drawn from an underlying Gaussian distribution with unknown mean μq and variance σq2, To estimate the posterior distribution p $(\mu_q, \sigma_q^2 | q_1, \ldots, q_N)$, place priors over the likelihood variables with a Gaussian prior on $\mu_q \sim \mathcal{N}(\gamma, \sigma_q^{2 \, v-1})$ and an Inverse-Gamma prior on $\sigma_q^2 \sim \Gamma^{-1}(\alpha, \beta)$. Approximate the posterior distribution with a Normal Inverse-Gamma (NIG) distribution as follows:

$$p(\mu_q, \sigma_q^2 | \gamma, v, \alpha, \beta) = \frac{\beta^\alpha \sqrt{v}}{\Gamma(\alpha)\sqrt{2\pi\sigma_q^2}} \left(\frac{1}{\sigma_q^2}\right)^{\alpha+1} \exp\left\{-\frac{2\beta + v(\gamma - \mu_q)^2}{2\sigma_q^2}\right\}. \tag{9}$$

Sampling an instance from the NIG distribution yields a Gaussian distribution $\mathcal{N}(\mu_{qj}, \sigma_{q_j}^2)$ from which scene coordinates qj are drawn. Hence, the NIG distribution can be interpreted as the evidential distribution on top of the unknown likelihood distribution from which observations are drawn. By estimating the NIG hyperparameters ($\gamma$, v, $\alpha$, $\beta$), it is possible to compute the prediction $\mathbb{E}[\mu]=\gamma$, aleatoric uncertainty $\mathbb{E}[\sigma^2]=\beta/(\alpha-1)$, and epistemic uncertainty Var $[\mu]=\beta/(v(\alpha-1))$. To train a network to output the correct scene coordinates and the hyperparameters of the corresponding NIG distribution, modify the last layer of the scene coordinate regression network to predict ($\gamma$, v, $\alpha$, $\beta$), and maximize the model fit while minimizing evidence on errors:

$$\mathcal{L}_{coord} = \sum_{q \in S} \left[ \left(\alpha + \frac{1}{2}\right) \log((q - \gamma)^2 v + 2\beta(1 + v)) \right] + \tag{10}$$

$$\sum_{q \in S} \left[ \frac{1}{2} \log\left(\frac{\pi}{v}\right) - \alpha \log(2\beta(1 + v)) \right] +$$

$$\sum_{q \in S} \left[ \log\left(\frac{\Gamma(\alpha)}{\Gamma\left(\alpha + \frac{1}{2}\right)}\right) + |q - \gamma| \cdot (2v + \alpha) \right].$$

In this way, the model regresses the scene coordinates for each pixel with corresponding uncertainty, which reflects the confidence of the underlying 2D-3D correspondence. It is possible to filter out unreliable correspondences by thresholding the uncertainty before performing RANSAC-PnP. In addition, the epistemic uncertainty can be considered as a proxy for information gain and further serve as a score in the following novel views selection policy.

To enhance visual localization performance, use NeRF to render more training data Snew from different poses in the scene. First randomly sample candidate views within the scene and perform a pruning step thereafter. Note that the view sampling process is very fast as NeRF rendering may be highly efficient. One or more of the following criteria are used to remove inferior candidates: (1) views with rendered depth smaller than zmin are too close to the scene structure and are considered invalid; (2) views with large depth uncertainty carry incorrect geometric information of the scene; (3) views with large color uncertainty contain bad image information that would confuse the scene coordinate regression network. This first round of pruning improves the overall quality of the rendered novel view set, but Snew may still contain unnecessary redundancy. E.g., given a new view, if the scene coordinate regression network has already learned it well from Sreal and is very confident in its prediction, the new view will bring little information gain. Therefore, another view selection step is performed.

The epistemic uncertainty can be used as a proxy for information gain. A view selection policy is therefore optionally guided by the scene coordinate epistemic uncertainty. For each of the rendered images in Snew, apply the scene coordinate regression network pre-trained from Sreal to get an epistemic uncertainty 320 map (together with the scene coordinate 318 map). Use the mean epistemic uncertainty as a novel view score. To remove the influence of rendered artifacts, the color and depth uncertainties provided by NeRF are used to filter out unreliable pixels. The images with the top-k scores are considered to provide high information gain and are selected to form the novel view set Shigh. As an example of the effectiveness of this policy, the room_0 scene of the Replica (trade mark) dataset provides 900 training images. Select ⅓ of them as Sreal, render around 1000 images as Snew and select 150 of them to form Shigh. By using only a small portion of the provided training set and selecting a small set of novel views, the scene coordinate regression network can significantly outperform its counterpart trained on the full training set. For the scene room_0 the mean pose error in centimetres was 2.38 without using the present technology and 1.98 when using the present technology.

Noise and artifacts appear in the rendered data. Directly supervising the scene coordinate regression network with such data would feed the network incorrect mapping signals. In some examples, the depth and color uncertainties are used to remove bad samples from the training set. In other examples, use the depth and/or color uncertainties adopt them on pixel level. Firstly, pixels with either uncertainty beyond a threshold are ignored in the loss. Secondly, they are used to weigh the remaining pixels. Since the scene coordinate regression network 304 is trained with image-depth pairs, consider both uncertainties and formulate the weighting function as $\kappa = e^{-2(\sigma_c^2 + \sigma_z^2)}$, then replace (q−γ) with κ(q−γ) in Eq.10. This weighting encourages the scene coordinate regression network 304 to memorize well-rendered regions better while paying less attention to uncertain regions.

Experiments on public datasets demonstrate that by only using a fraction of available real data and a small amount of generated images, the methods described herein can perform comparably well or even outperform counterpart methods trained on a full training set.

Figure 7:
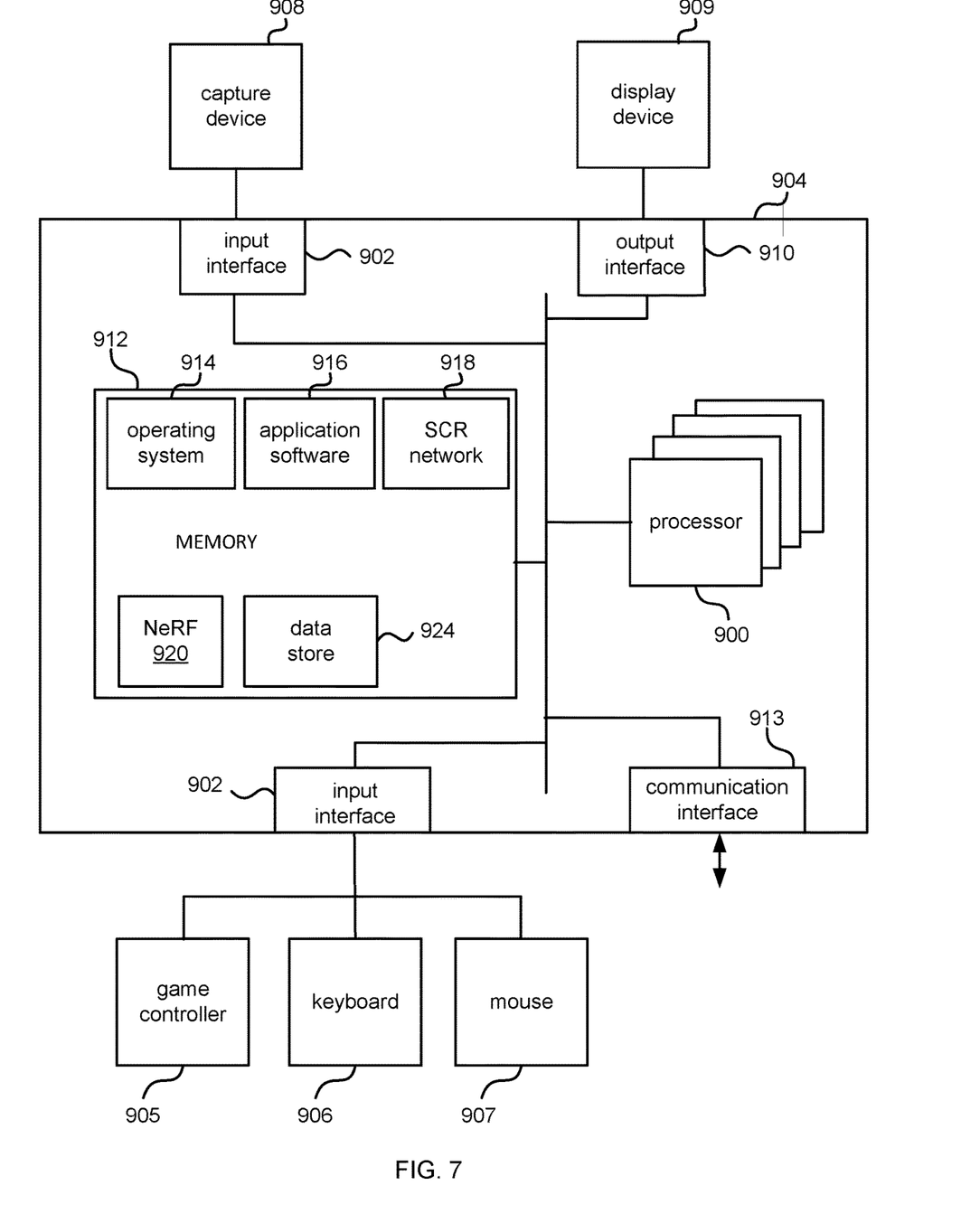
FIG. 7 illustrates an exemplary computing-based device in which examples of an apparatus for generating images for training a neural network, or of an apparatus for performing visual localization are implemented.

FIG. 7 illustrates an exemplary computing-based device in which examples of an apparatus for generating images for training a neural network, or of an apparatus for performing visual localization are implemented. Computing-based device 904 is implemented as any form of a computing and/or electronic device, and in which embodiments of a visual localization service, or an apparatus for generating training images are implemented in some examples.

Computing-based device 904 comprises one or more processors 900 which are microprocessors, controllers or any other suitable type of processors for processing computer executable instructions to control the operation of the device in order to generate images for training a scene coordinate regression network, or training a scene coordinate regression network, or for carrying out visual localization. In some examples, for example where a system on a chip architecture is used, the processors 900 include one or more fixed function blocks (also referred to as accelerators) which implement a part of the method of any of FIGS. 3 to 6 in hardware (rather than software or firmware). The computing-based device has a neural radiance field 920 and optionally a scene coordinate regression network 918. Data store 924 holds images, uncertainty data, uncertainty maps, correspondences or other data. Platform software comprising an operating system 914 or any other suitable platform software is provided at the computing-based device to enable application software 916 to be executed on the device.

The computer executable instructions are provided using any computer-readable media that is accessible by computing based device 904. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 904 it will be appreciated that the storage is, in some examples, distributed or located remotely and accessed via a network or other communication link (e.g. using communication interface 913).

The computing-based device 904 also comprises an input interface 902 and an output interface 910. The output interface 910 is arranged to output display information to a display device 909 which may be separate from or integral to the computing-based device 904. The display information may provide a graphical user interface. The input interface 902 is arranged to receive and process input from one or more devices, such as a user input device (e.g., a mouse 907, keyboard 906, game controller 905, capture device 908, such as a camera microphone or other sensor). In some examples the user input device detects voice input, user gestures or other user actions and provides a natural user interface (NUI).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising: accessing a plurality of training examples, each training example comprising a color image of a scene, a depth image of the scene, and a pose of a viewpoint from which the color image and depth image were captured; training a neural radiance field using the training examples; computing a plurality of generated images comprising, for a plurality of randomly selected viewpoints, generating a color image and a depth image of the scene from the neural radiance field and for the plurality of generated images, inspecting depth values of the generated image; and training a neural network using the generated images, the training of the neural network including omitting at least one of the generated images according to the depth values being below a threshold.

2. The method of claim 1 wherein training the neural network comprises training the neural network with the generated images such that the neural network is able to predict correspondences between two dimensional (2D) image elements of an image of the scene and three-dimensional (3D) locations in a map of the scene comprising a 3D point cloud.

3. The method of claim 2 comprising: receiving an image captured by a mobile image capture device in the scene; computing a plurality of correspondences by inputting the received image to the neural network; and computing a 3D position and orientation of the mobile image capture device with respect to the map, by inputting the correspondences to a perspective n point solver.

4. The method of claim 1 comprising, pre training the neural network using the plurality of training examples.

5. The method of claim 1 further comprising: for the plurality of generated images, computing a color uncertainty map from the neural radiance field; and wherein training the neural network comprises omitting at least one of the generated images according to the color uncertainty map of the omitted image indicating uncertainty over a threshold; and wherein the neural radiance field is trained using a negative log-likelihood loss with a variance-weighting term on color output of the neural radiance field.

6. The method of claim 5 wherein the variance-weighting term is an adaptive learning rate.

7. The method of claim 6 wherein the variance-weighting term comprises a parameter allowing for interpolation between the negative log-likelihood loss and a mean squared error loss.

8. The method of claim 1 comprising, for the plurality of generated images, computing a depth uncertainty map from the neural radiance field; and wherein training the neural network comprises omitting one of the generated images according to the depth uncertainty map of the omitted image indicating uncertainty over a threshold.

9. The method of claim 8 comprising training the neural radiance field using a Gaussian negative log-likelihood loss on depth output of the neural radiance field.

10. The method of claim 8 comprising training the neural radiance field using a loss computed as a sum over rays projected into the neural radiance field to generate an image of: a logarithm of a square of a standard deviation of a predicted depth for the ray plus the square of an L2 difference between the predicted depth of the ray minus an actual depth of the ray, divided by the square of the standard deviation of the predicted depth for the ray.

11. The method of claim 1 comprising training the neural radiance field using a loss function having a color term and a depth term.

12. The method of claim 1 wherein the neural network outputs, for a predicted correspondence, an uncertainty value.

13. The method of claim 12 wherein the uncertainty value for the predicted correspondence is computed by predicting hyperparameters of a normal inverse-gamma distribution.

14. The method of claim 1 comprising, pre training the neural network using the plurality of training examples; and prior to training the neural network using the generated images, predicting correspondences having associated uncertainty values from the generated images using the neural network; and wherein training the neural network comprises omitting one of the generated images according to an uncertainty value of a predicted correspondence for the omitted generated image being above a threshold.

15. The method of claim 1 comprising pre training the neural network using the plurality of training examples; and prior to training the neural network using the generated images, predicting correspondences having associated uncertainty values from the generated images using the neural network; and wherein training the neural network comprises using a loss function having terms which weigh pixels according to color uncertainty and depth uncertainty from the neural radiance field.

16. An apparatus comprising: a processor; a memory storing instructions that, when executed by the processor, perform a method comprising: accessing a plurality of training examples, each training example comprising a color image of a scene, a depth image of the scene and a pose of a viewpoint from which the color image and depth image were captured; training a neural radiance field using the training examples; computing a plurality of generated images comprising, for a plurality of randomly selected viewpoints, generating a color image and a depth image of the scene from the neural radiance field and computing a color uncertainty map from the neural radiance field; and training a scene coordinate regression neural network using the generated images, the training of the scene coordinate regression neural network including omitting at least one of the generated images according to the color uncertainty map of the omitted image indicating an uncertainty over a threshold.

17. A computer storage medium having computer-executable instructions that, when executed by a computing system, direct the computing system to perform operations comprising: accessing a plurality of training examples, each training example comprising a color image of a scene, a depth image of the scene, and a pose of a viewpoint from which the color image and depth image were captured; training a neural radiance field using the training examples; computing a plurality of generated images comprising, for a plurality of randomly selected viewpoints, generating a color image and a depth image of the scene from the neural radiance field; for the plurality of generated images, computing a color uncertainty map from the neural radiance field; and training a neural network using the generated images, the training of the neural network including omitting at least one of the generated images according to the color uncertainty map of the omitted image indicating an uncertainty over a threshold.

18. The computer storage medium of claim 17, wherein the computing system further performs operations comprising: training the neural radiance field using a loss function having a color term and a depth term.

19. The computer storage medium of claim 17, wherein the computing system further performs operations comprising: receiving an image captured by a mobile image capture device in the scene; computing a plurality of correspondences by inputting the received image to the neural network; and computing a three-dimensional (3D) position and orientation of the mobile image capture device, by inputting the correspondences to a perspective n point solver.

20. The computer storage medium of claim 17, wherein training the neural network comprises training the neural network with the generated images such that the neural network is able to predict correspondences between two-dimensional (2D) image elements of an image of the scene and three-dimensional (3D) locations in a map of the scene comprising a 3D point cloud.

\* \* \* \* \*